US012784434B2

(12) United States Patent
Ogura

(10) Patent No.: US 12,784,434 B2
(45) Date of Patent: Nov. 3, 2026

(54) DRIVING ASSISTANCE APPARATUS, DRIVING ASSISTANCE METHOD

(71) Applicant: JVCKENWOOD Corporation, Yokohama (JP)

(72) Inventor: Takuya Ogura, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 251 days.

(21) Appl. No.: 18/674,186

(22) Filed: May 24, 2024

(65) Prior Publication Data

US 2024/0312199 A1 Sep. 19, 2024

Related U.S. Application Data

(63) Continuation of application No. PCT/JP2022/030922, filed on Aug. 16, 2022.

(30) Foreign Application Priority Data

Nov. 25, 2021 (JP) ................................ 2021-190764

(51) Int. Cl.
*G06K 9/00* (2022.01)
*G06V 10/98* (2022.01)
(Continued)

(52) U.S. Cl.
CPC .............. *G06V 10/98* (2022.01); *G06V 20/58* (2022.01); *G06V 20/588* (2022.01)

(58) Field of Classification Search
CPC ...... G06V 10/98; G06V 20/58; G06V 20/588; G06T 7/00; G06T 7/60; G08G 1/16
See application file for complete search history.

(56) References Cited

U.S. PATENT DOCUMENTS

2012/0194680 A1* 8/2012 Ishii ...................... G06V 20/58 348/148
2017/0270375 A1* 9/2017 Grauer .................. G06V 10/60
(Continued)

FOREIGN PATENT DOCUMENTS

JP 2001108758 A 4/2001
JP 2012120047 A 6/2012
(Continued)

OTHER PUBLICATIONS

Paidi, Vijay, et al. "Tracking vehicle cruising in an open parking lot using deep learning and kalman filter." Journal of Advanced Transportation Jan. 2021 (Aug. 2021): 1812647. (Year: 2021).*
(Continued)

*Primary Examiner* — Gregory A Morse
*Assistant Examiner* — Owais I Memon
(74) *Attorney, Agent, or Firm* — PROCOPIO, CORY, HARGREAVES & SAVITCH LLP

(57) ABSTRACT

A driving assistance apparatus according to the present embodiment includes: a video acquisition unit configured to acquire a video in which images of an outside of a vehicle are taken with a far-infrared camera; a person detection unit configured to detect a person from the video by referring to a person recognition model; an another vehicle detection unit configured to detect another vehicle from the video by referring to a vehicle recognition model, and determine whether the another vehicle which is detected is traveling; and a determination unit configured to determine that, in a case where the another vehicle is determined to be traveling, when a detection range of the another vehicle overlaps with at least a part of a detection range of the person, the person detected overlappingly with the detection range of the another vehicle determined to be traveling is false detection.

6 Claims, 6 Drawing Sheets

(51) Int. Cl.
*G06V 20/56* (2022.01)
*G06V 20/58* (2022.01)

(56) References Cited

U.S. PATENT DOCUMENTS

| | | | | |
|---|---|---|---|---|
| 2018/0197022 | A1 | 7/2018 | Fujikawa | |
| 2019/0347938 | A1* | 11/2019 | Chase .................... | B60K 35/23 |
| 2020/0290623 | A1 | 9/2020 | Ogura | |

FOREIGN PATENT DOCUMENTS

| | | | |
|---|---|---|---|
| JP | 2018101437 | A | 6/2018 |
| JP | 2020027380 | A | 2/2020 |

OTHER PUBLICATIONS

O'Malley, Ronan. Vision Algorithms and Systems for Vehicle and Pedestrian Detection in Night Time Conditions Using Vehicle Mounted Cameras. Diss. 2011. (Year: 2011).*
Nowosielski, Adam, et al. "Embedded night-vision system for pedestrian detection." IEEE Sensors Journal 20.16 (2020): 9293-9304. (Year: 2020).*
Gaszczak, Anna, Toby P. Breckon, and Jiwan Han. "Real-time people and vehicle detection from UAV imagery." Intelligent robots and computer vision XXVIII: algorithms and techniques. vol. 7878. SPIE, 2011. (Year: 2011).*
International Search Report of PCT/JP2022/030922, dated Nov. 1, 2022.

* cited by examiner

DRIVING ASSISTANCE APPARATUS, DRIVING ASSISTANCE METHOD

CROSS REFERENCE TO RELATED APPLICATION

This application is based upon and claims the benefit of priority from Japanese patent application No. 2021-190764, filed on Nov. 25, 2021, the disclosure of which is incorporated herein in its entirety by reference.

BACKGROUND

The present disclosure relates to a driving assistance apparatus and a driving assistance method.

A technique of using a far-infrared camera to generate a thermal image by receiving far-infrared rays emitted from a target of image-taking, and detect an object in its surroundings, has been known. Japanese Unexamined Patent Application Publication No. 2020-27380 describes that a driving assistance apparatus uses a recognition model (dictionary) created by machine learning on a thermal image obtained with a far-infrared camera set in a vehicle, to detect a vehicle, pedestrian, passenger, and the like.

SUMMARY

A thermal image taken with a far-infrared camera often has a low resolution, and heat distribution of an object other than a person such as a vehicle may be falsely recognized as a person. In particular, if it is falsely recognized that a person exists in a lane of a traveling direction of a vehicle although such person actually does not exist, a driver of the vehicle searches for the person by visual observation based on a false recognition result, and thus confirmation of the surroundings of the vehicle in the meantime will be neglected.

A driving assistance apparatus according to the present embodiment includes: a video acquisition unit configured to acquire a video in which images of an outside of a vehicle are taken with a far-infrared camera; a person detection unit configured to detect a person from the video acquired with the video acquisition unit by referring to a person recognition model; an another vehicle detection unit configured to detect another vehicle from the video acquired with the video acquisition unit by referring to a vehicle recognition model, and determine whether the another vehicle which is detected is traveling; and a determination unit configured to determine that, in a case where the another vehicle is determined to be traveling, when a detection range of the another vehicle detected with the another vehicle detection unit overlaps with at least a part of a detection range of the person detected with the person detection unit, the person detected overlappingly with the detection range of the another vehicle determined to be traveling is false detection.

A driving assistance method according to the present embodiment is a driving assistance method to be executed by a driving assistance apparatus, including steps of: acquiring a video in which images of an outside of a vehicle are taken with a far-infrared camera; detecting a person from the video which is acquired by referring to a person recognition model; detecting another vehicle from the video which is acquired, by referring to a vehicle recognition model, and determining whether the another vehicle which is detected is traveling; and determining that, in a case where the another vehicle is determined to be traveling, when a detection range of the another vehicle which is detected overlaps with at least a part of a detection range of the person who is detected, the person detected overlappingly with the detection range of the another vehicle determined to be traveling is false detection.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, a driving assistance apparatus and a driving assistance method according to embodiments of the present invention will be described with reference to the drawings. However, the present disclosure is not limited to the following embodiments. In addition, the following descriptions and drawings are appropriately simplified to make the explanations clear.

Embodiment 1

Figure 1:
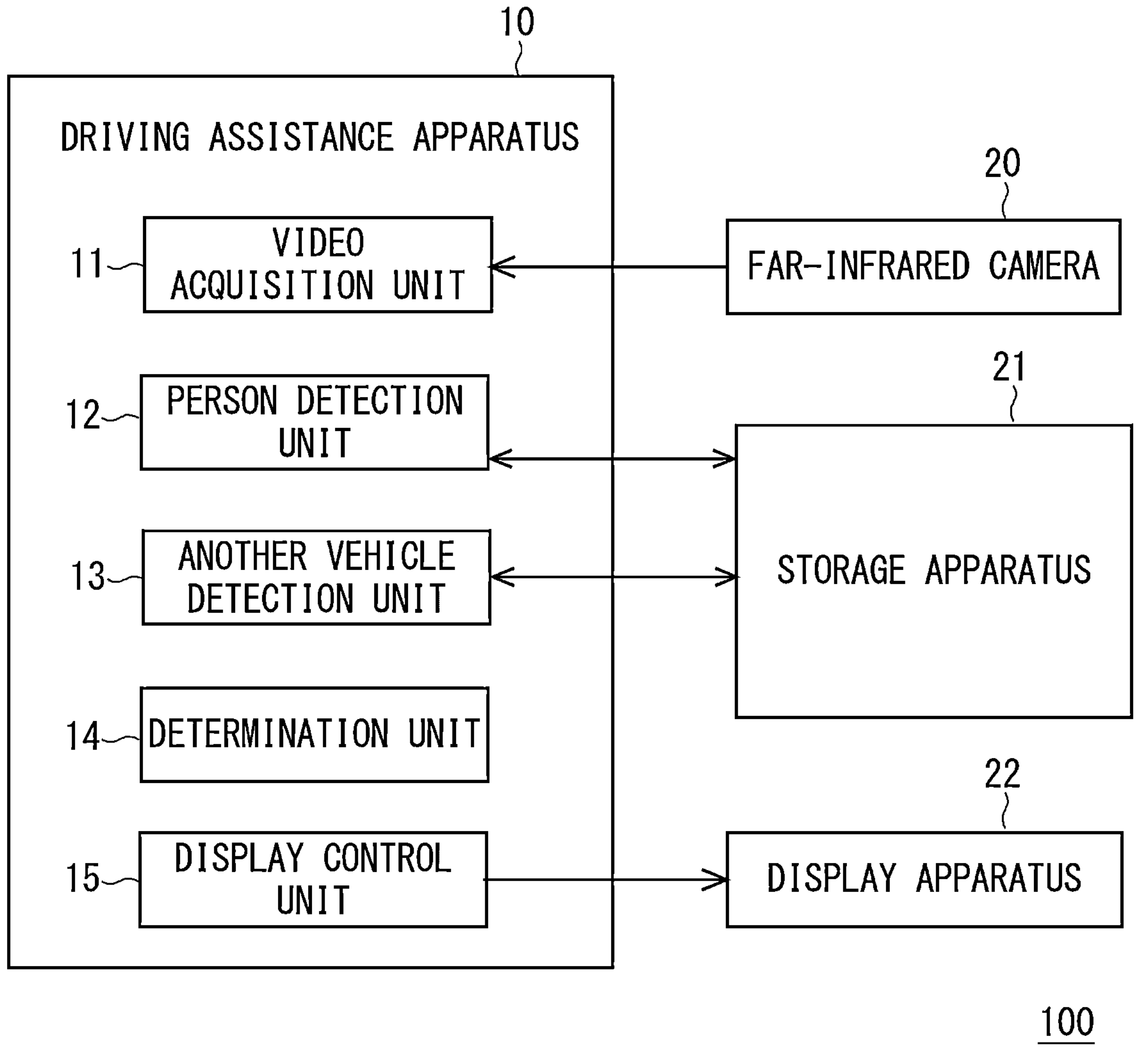
FIG. 1 is a block diagram illustrating a schematic configuration of a driving assistance apparatus according to Embodiment 1.

FIG. 1 is a block diagram illustrating a schematic configuration of a driving assistance apparatus according to Embodiment 1. A driving assistance system 100 includes a driving assistance apparatus 10, a far-infrared camera 20, a storage apparatus 21, and a display apparatus 22. The driving assistance system 100 is installed in, for example, a vehicle such as a passenger car or a two-wheeled vehicle. The driving assistance system 100 detects an object (another vehicle, person, or the like) in the surroundings of an own vehicle in which the driving assistance system 100 is installed.

The far-infrared camera 20 is installed in, for example, a front grille or its surrounding part of the own vehicle. The far-infrared camera 20 continuously takes images of an outside of the vehicle in a predetermined image taking range (image taking angle of view) at a predetermined image taking rate, and generates a far-infrared video consisting of a plurality of pieces of image data in time series. Specifically, the far-infrared camera 20 takes images of the circumference of the own vehicle, in particular, a far-infrared video (thermal image) in a traveling direction of the own vehicle, for output to the driving assistance apparatus 10.

The far-infrared camera 20 generates a far-infrared video by receiving far-infrared rays due to heat based on an operation of another vehicle or heat released by a person. Note that heat based on an operation of a vehicle refers to, for example, heat release from an engine hood or a front grille at the front of the vehicle, heat release from an exhaust cylinder (exhaust port) at the back of the vehicle, heat release from a tire and its surroundings, and the like. In addition, if at nighttime, heat release from a head light or a tail lamp is also included.

From the far-infrared video taken with the far-infrared camera 20, the driving assistance apparatus 10 detects another vehicle, a person, or the like in the surroundings of the own vehicle in which the driving assistance system 100 is mounted, and performs a processing of notifying a driver of the own vehicle with a video or a voice as necessary. As illustrated in FIG. 1, the driving assistance apparatus 10 includes a video acquisition unit 11, a person detection unit 12, an another vehicle detection unit 13, a determination unit 14, and a display control unit 15.

The storage apparatus 21 stores data of various learned models such as vehicle recognition models and person recognition models. These learned models are created by machine learning of a far-infrared video of a vehicle, a person such as a pedestrian, or the like. The driving assistance apparatus 10 uses these learned models when detecting another vehicle, a person, or the like from a far-infrared video. Note that an ordinary image recognition processing can be used for the detection of another vehicle, a person, or the like.

The video acquisition unit 11 acquires, from the far-infrared camera 20, a far-infrared video in which images of an outside of a vehicle are taken. The person detection unit 12 uses a person recognition model read out from the storage apparatus 21 to detect a person from the far-infrared video. As mentioned above, since an image to be the target of person recognition by the person detection unit 12 is the far-infrared video, a sensor of a low resolution is often used, and thus heat distribution of a vehicle or the like may be recognized as a person. Accordingly, a result detected with the person detection unit 12 may include false detection, that is, a result in which heat distribution in a range where a person actually does not exist is falsely detected as a person.

Figure 6:
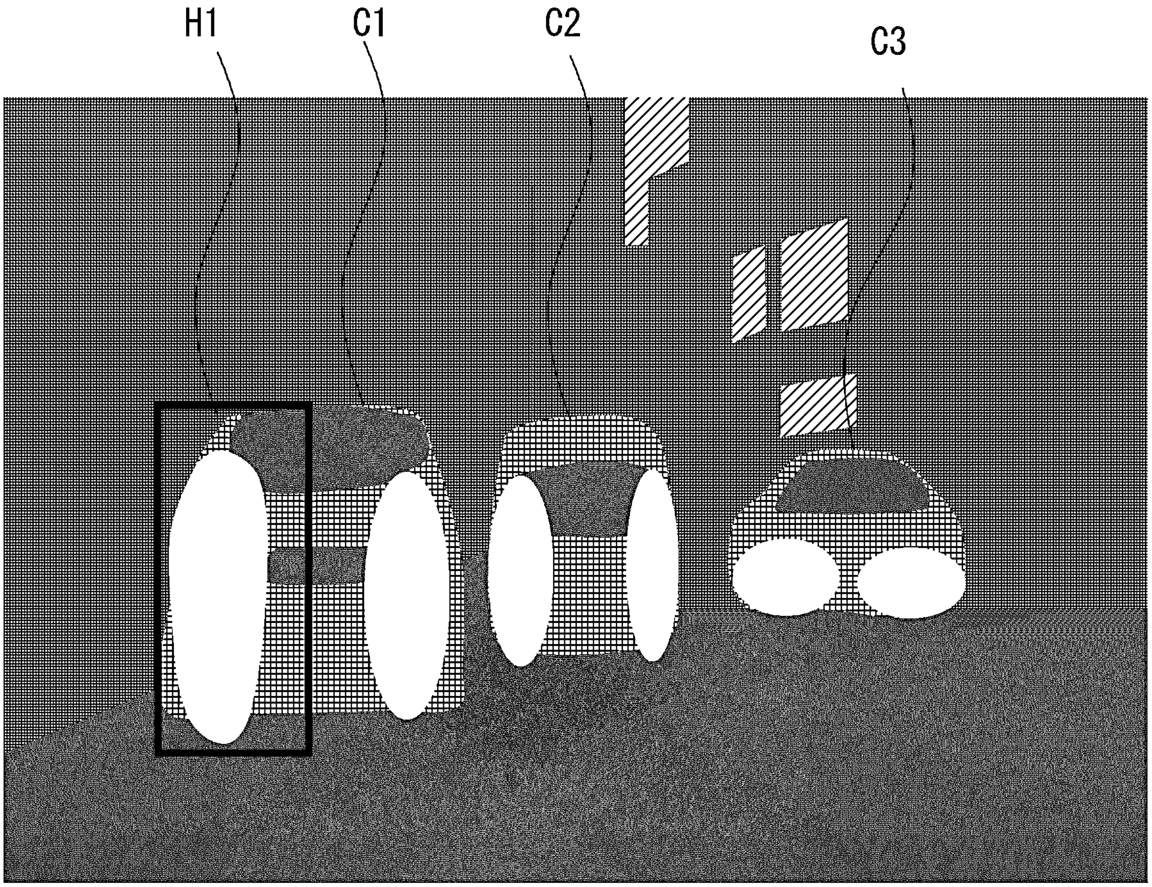
FIG. 6 is a diagram illustrating an example in which a person is falsely recognized in a far-infrared video acquired with a far-infrared camera.

FIG. 6 is a diagram illustrating an example in which a person is falsely detected in a far-infrared video acquired with the far-infrared camera. In this example, a person actually does not exist in front of another vehicle Cl traveling ahead of the own vehicle, which is the traveling direction. As illustrated in FIG. 6, heat distribution resembles a shape of a person due to heat based on an operation of another vehicle or the like, and as a result of falsely recognizing existence of a person, a detection frame or the like indicating a falsely detected person H1 is displayed in the acquired far-infrared video for the driver of the own vehicle. In this case, the driver of the own vehicle actually confirms the person H1 based on the false recognition result by visual observation, and thus confirmation of the surroundings of the vehicle in the meantime will be neglected.

Therefore, in the driving assistance apparatus 10 according to Embodiment 1, the another vehicle detection unit 13 and the determination unit 14 perform the following processings. The another vehicle detection unit 13 uses a vehicle recognition model read out from the storage apparatus 21 to detect another vehicle in the surroundings of the own vehicle from the far-infrared video. In addition, the another vehicle detection unit 13 determines whether the detected another vehicle is traveling.

For example, the another vehicle detection unit 13 refers to a plurality of frames in the far-infrared video consisting of a plurality of pieces of image data in time series to determine whether the another vehicle is traveling. For example, the another vehicle can be determined to be traveling when a positional relation between the detected another vehicle and its surrounding object (road surface, building, or the like) is changing, or based on a change in a relative positional relation of the another vehicle based on a traveling speed of the own vehicle, or the like.

If it is determined that the another vehicle is traveling, when at least a part of a detection range of the person detected with the person detection unit 12 overlaps with a detection range of the another vehicle detected with the another vehicle detection unit 13, the determination unit 14 determines that the person detected overlappingly with the detection range of the traveling another vehicle is false detection. In this manner, false detection of a person in the far-infrared video can be reduced.

Note that, when a vehicle is traveling at a low speed at the time of slowing down or at the time of a traffic jam, a person crossing a road from between the vehicle and the another vehicle may exist. For the driver of the own vehicle, detection of such person has a high priority. Thus, it is desirable that the determination unit 14 determines traveling of the another vehicle when the another vehicle is traveling at a predetermined speed or more, for example, 10 km/h or more. In this manner, when traveling at a lower speed than the predetermined speed, a person running out from between the vehicle and the another vehicle can be detected, and when traveling at the predetermined speed or more, false detection of a person can be reduced.

The display control unit 15 performs control of notifying information related to the detected person to the driver of the own vehicle with a video. For example, the display control unit 15 draws, in a far-infrared video acquired with the video acquisition unit 11, a frame line (detection frame) indicating a person excluding persons determined to be false detection by the determination unit 14 from among persons detected with the person detection unit 12, as a person.

The display control unit 15 outputs, to the display apparatus 22, a detection result video in which the detection frame is added to the acquired far-infrared video. The display apparatus 22 displays the detection result video transmitted from the display control unit 15 in a manner enabling visual observation by the driver of the own vehicle. In this manner, the driver of the own vehicle can recognize a person who actually exists.

Note that the information related to the detected person may be notified to the driver of the own vehicle with a voice. The voice may be output from the driving assistance apparatus 10, or may be output from an apparatus outside of the driving assistance apparatus 10.

Figure 2:
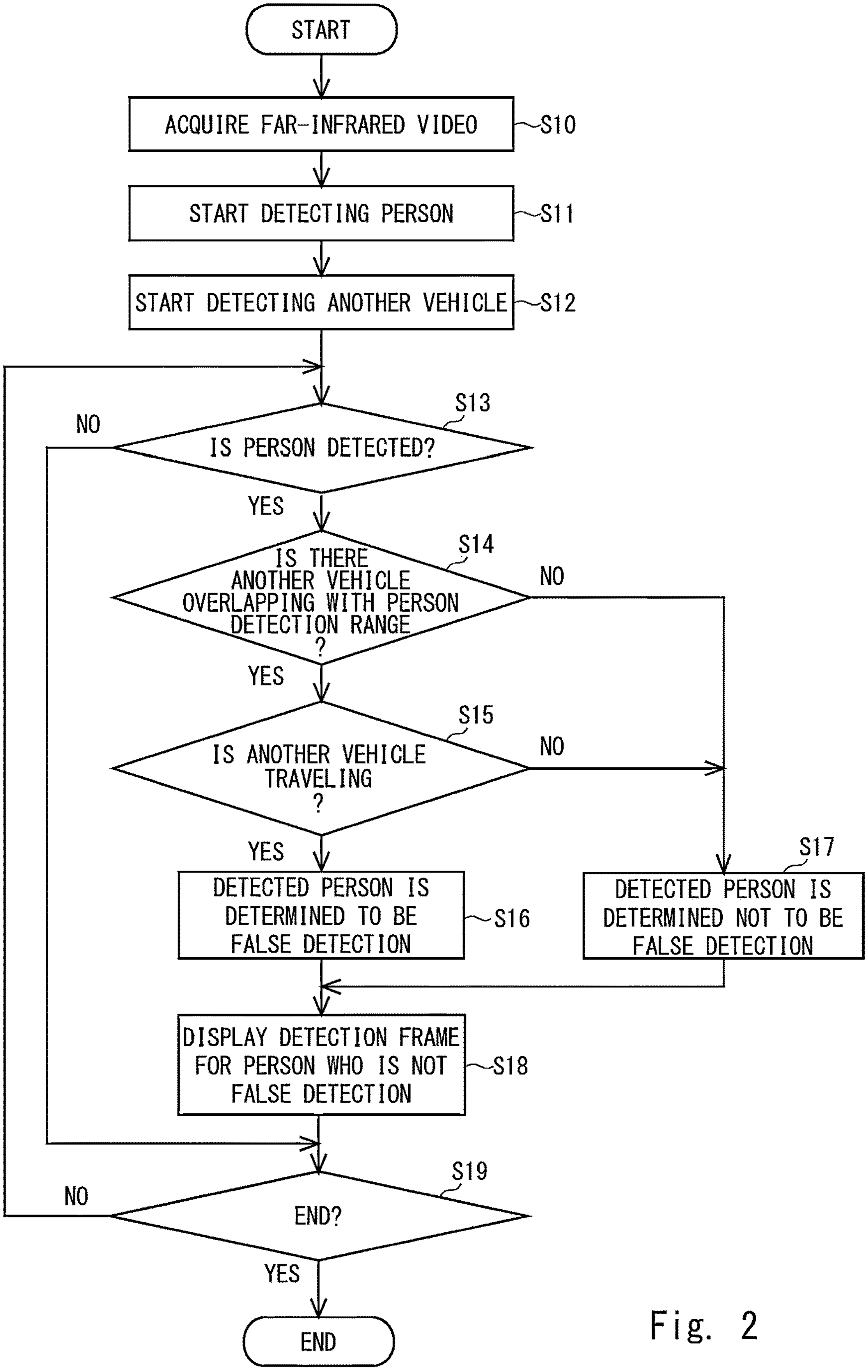
FIG. 2 is a flow chart describing a driving assistance method according to Embodiment 1.

Next, an operation of the driving assistance apparatus 10, that is, a driving assistance method will be described with reference to FIG. 2. FIG. 2 is a flow chart describing a driving assistance method according to Embodiment 1. In accordance with start of an operation of the driving assistance system 100, the far-infrared camera 20 starts taking images of a far-infrared video in a traveling direction of the own vehicle, and the video acquisition unit 11 acquires this far-infrared video (Step S10).

In addition, once the far-infrared camera 20 starts taking images, the person detection unit 12 refers to a person recognition model, and starts detection of a person from the far-infrared video (Step S11). Similarly, the another vehicle detection unit 13 refers to a vehicle recognition model, and starts detection of another vehicle from the far-infrared video (Step S12). Next, the person detection unit 12 determines whether a person is detected (Step S13). In Step S13, if a person is not detected (Step S13: NO), the processing progresses to Step S19.

In Step S13, if a person is detected (Step S13: YES), based on a detection result of the another vehicle detection unit 13, the determination unit 14 determines whether another vehicle overlapping with a range in which the person is detected exists (Step S14). The determination performed in Step S14 specifies a detection range of the detected person in the far-infrared video, while also specifying a detection range of the detected another vehicle in the far-infrared video, and determines whether at least a part of the detection range of the person overlaps with the detection range of the another vehicle. For example, if a ratio of overlapping of the detection range of the person and the detection range of the another vehicle is relatively small, since the person is detected based on different heat distribution from heat distribution of the detected another vehicle, there is a high probability that the detected person is appropriately detected as a person. If the ratio of overlapping of the detection range of the person and the detection range of the another vehicle is relatively large, there is a high probability that the heat distribution of the detected another vehicle is falsely detected as a person. Accordingly, the determination performed in Step S14 may make it a condition that a predetermined ratio or more, for example, 70% or more of the detection range of the detected person overlaps with the detection range of the another vehicle.

In Step S14, if existence of another vehicle overlapping with the person detection range is not determined (Step S14: NO), the processing progresses to Step S17. In addition, if existence of another vehicle overlapping with at least a part of the person detection range is determined (Step S14: YES), based on the detection result of the another vehicle detection unit 13, whether the another vehicle overlapping with the detection range of the person is traveling is determined (Step S15). Regarding the determination on whether the another vehicle is traveling, as mentioned above, it is preferable that the another vehicle is determined to be traveling if the another vehicle is traveling at, for example, 10 km/h or more. The processing of Step S15 may be included in the processing of Step S14. In this case, the processing of Step S14 determines whether there is traveling another vehicle which overlaps with the person detection range.

In addition, although the another vehicle detection unit 13 starts detection of another vehicle in Step S12, another vehicle may be detected if a person is detected in Step S13. Furthermore, a range of detecting another vehicle in the far-infrared video is not necessarily the entire far-infrared video, but the range may be limited to the surroundings of the person detected in Step S13.

In Step S15, if it is determined that the another vehicle is not traveling (Step S15: NO), that is, if the another vehicle is at a stop or is traveling at less than a predetermined speed, the processing progresses to Step S17. In addition, in Step S15, if it is determined that the another vehicle is traveling (Step S15: YES), the processing progresses to Step S16.

In Step S16, based on determination results in Step S14 and Step S15, the determination unit 14 determines that the detected person is false detection. That is to say, the person detected overlappingly with the detection range of the traveling another vehicle is determined to be false detection. In addition, in Step S17, based on the determination result in Step S14 or Step S15, the determination unit 14 determines that the detected person is not false detection.

Next, based on the result determined in Step S16 or Step 17, the display control unit 15 displays the far-infrared video acquired with the video acquisition unit 11 by including a detection frame. Specifically, among persons detected with the person detection unit 12, a detection frame is not displayed for a person determined to be false detection by the determination unit 14, and a detection frame is displayed for a person determined not to be false detection by the determination unit 14 (Step S18).

For a person displayed with a detection frame in Step S18, a tracking processing is performed for each frame of the far-infrared video, and the display of the detection frame is continued until the person is no longer included in the far-infrared video, or until the display of the detection frame is no longer required.

Next, the driving assistance apparatus 10 determines whether to end the processing (Step S19). The end of the processing is a case where a condition of ending image-taking by the far-infrared camera 20 is satisfied, or a case where an engine or power of the own vehicle in which the driving assistance system 100 is installed is turned off. If it is determined to end the processing (Step S19: YES), the processing of FIG. 2 is ended. In addition, if it is determined not to end the processing (Step S19: NO), the processing progresses to Step S13.

Figure 3:
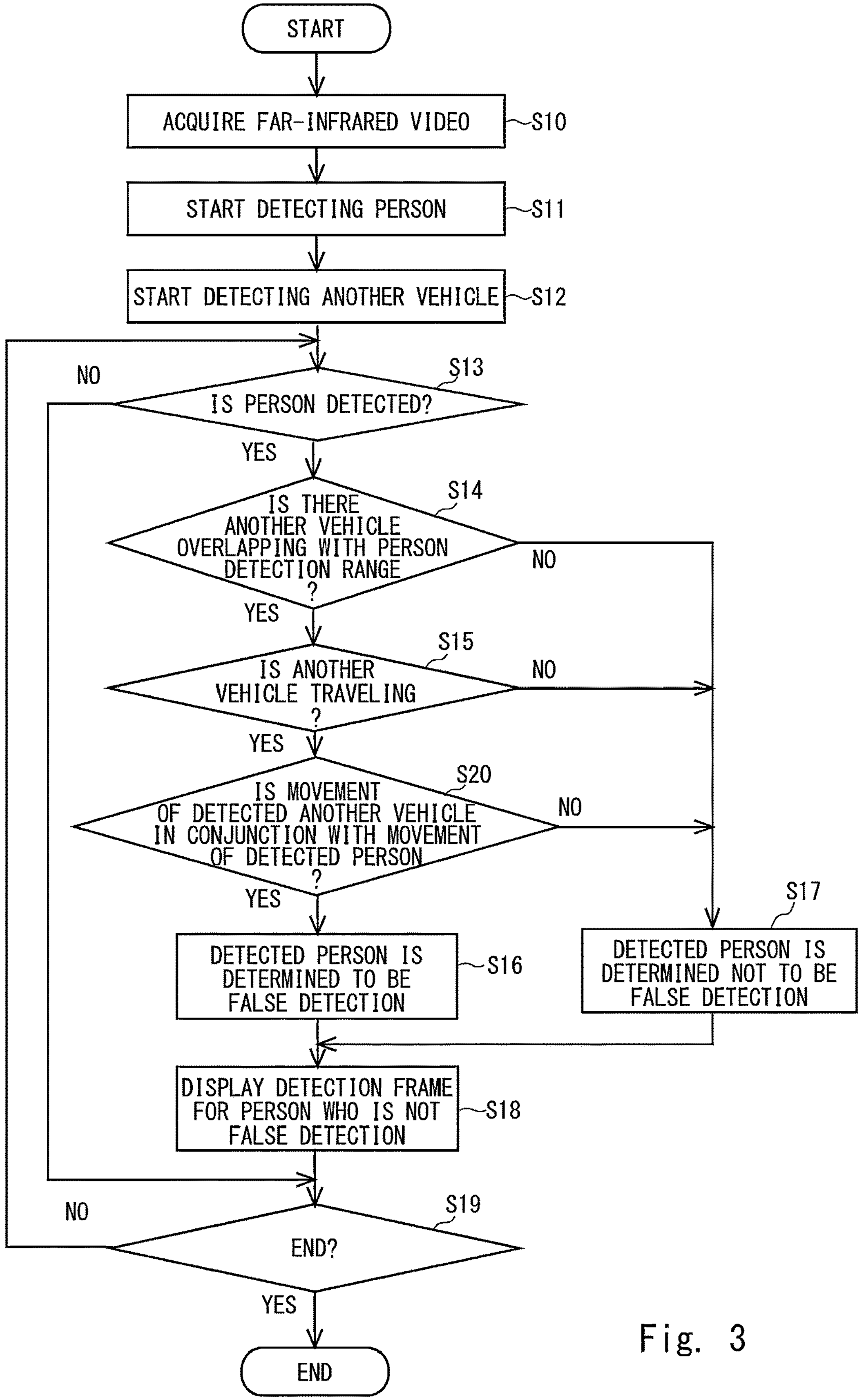
FIG. 3 is a flow chart describing another example of the driving assistance method according to Embodiment 1.

FIG. 3 is a flow chart describing another example of the driving assistance method according to Embodiment 1. In FIG. 3, the same processing as FIG. 2 is given the same reference sign. In FIG. 3, a difference from FIG. 2 is that Step S20 is provided between Step S15 and Step S16.

As illustrated in FIG. 3, if it is determined that the another vehicle is traveling in Step S15 (Step S15: YES), the processing moves to Step S20. In Step S20, whether a movement of the detected another vehicle is in conjunction with a movement of a person is determined. For example, the another vehicle detection unit 13 uses a detection position (detection frame or grounding position) of the another vehicle and a detection position (detection frame or grounding position) of the person detected with the person detection unit 12, and if moving distances and/or moving directions over time are equivalent, it can be determined that the another vehicle is in conjunction with the person. Alternatively, the another vehicle detection unit 13 determines that the movement of the another vehicle is in conjunction with the movement of the person on the point that movement vectors over time of coordinates of the far-infrared video showing the range of the detected person and coordinates of the far-infrared video showing the range of the detected another vehicle are the same or almost the same.

If the determination unit 14 determines that the detection position of the another vehicle is moving in conjunction with the detection position of the person (Step S20: YES), the processing progresses to Step S16. That is to say, the person moving in conjunction with the movement of the another vehicle is determined to be false detection (Step S16).

In this manner, in the example illustrated in FIG. 3, in a case where the another vehicle is determined to be traveling, when the detection range of the another vehicle detected with the another vehicle detection unit overlaps with at least a part of the detection range of the person detected with the person detection unit, if it is determined that the detection position of the another vehicle is moving in conjunction with the detection position of the person, the person detected overlappingly with the detection range of the another vehicle determined to be traveling is determined to be false detection. In this manner, a person in the far-infrared video can be detected more accurately.

Note that, if it is determined that the detection position of the another vehicle is not in conjunction with the detection position of the person (Step S20: NO), the processing progresses to Step S17. That is to say, a person whose movement is not in conjunction with the movement of the another vehicle is determined not to be false detection (Step S17).

Embodiment 2

Figure 4:
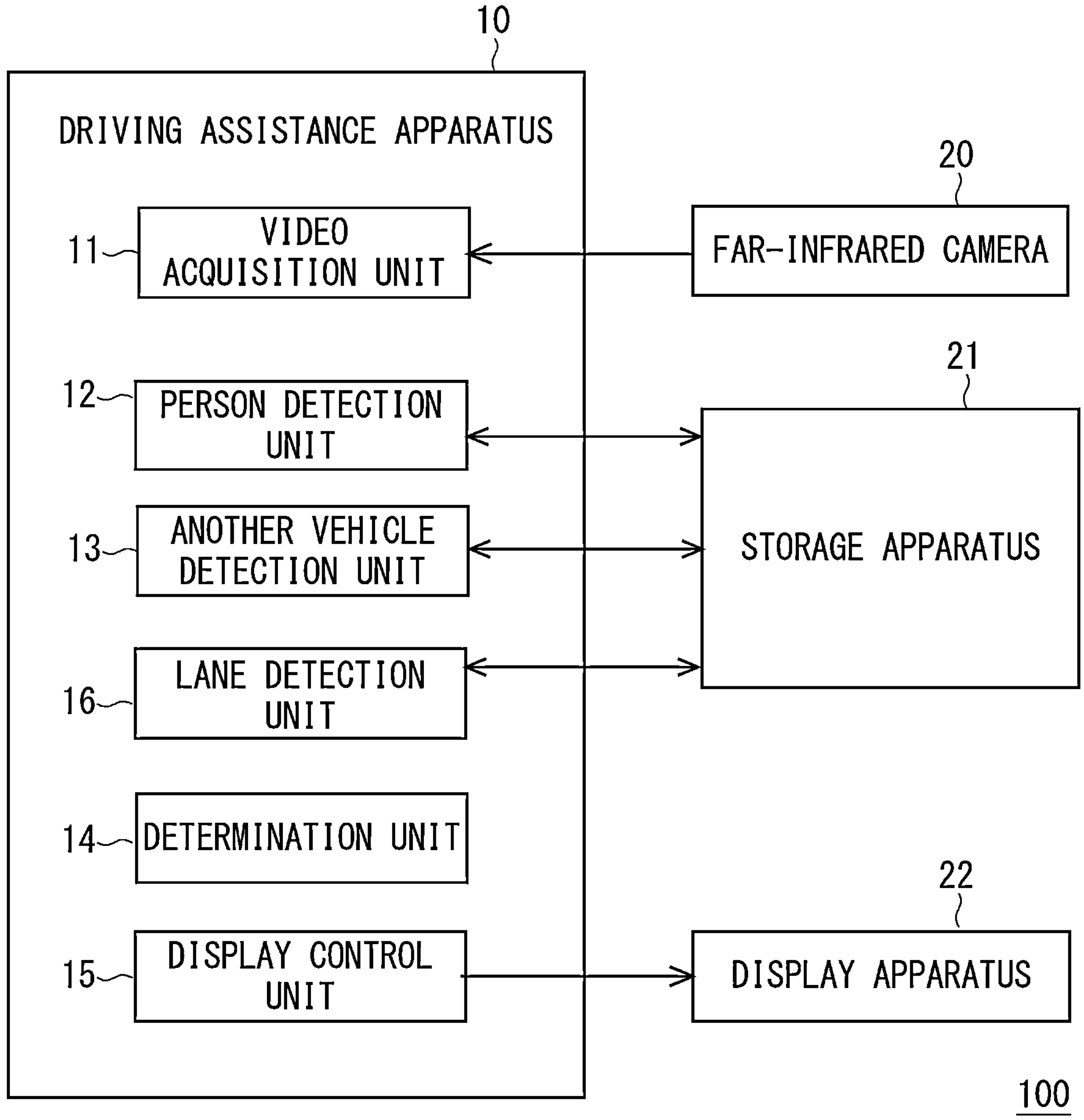
FIG. 4 is a block diagram illustrating a schematic configuration of a driving assistance apparatus according to Embodiment 2.

FIG. 4 is a block diagram illustrating a schematic configuration of a driving assistance apparatus according to Embodiment 2. In FIG. 4, the same constituent element as FIG. 1 is given the same reference sign, and descriptions will be appropriately omitted. In Embodiment 2, in addition to the configurations of FIG. 1, a lane detection unit 16 is further included.

The lane detection unit 16 detects a lane from the far-infrared video. For example, the lane detection unit 16 performs an edge detection processing on the far-infrared video, and performs a smoothing processing, a Hough transformation processing, and the like on the detected edge component, thereby detecting a lane marking and detecting a lane based on a position of the detected lane marking. Note that publicly-known various detection processings can be used for the detection of a lane marking, a lane, and the like.

The lane detection unit 16 detects a lane where the own vehicle is traveling based on the position of the detected lane marking. The lane where the own vehicle is traveling may be only the lane where the own vehicle is traveling, or if a plurality of lanes having the same direction as its traveling direction exist, in addition to the lane where the own vehicle is traveling, the plurality of lanes having the same traveling direction may be regarded as the lane where the own vehicle is traveling. If it is determined that the another vehicle is traveling in the lane where the own vehicle is traveling defined with the lane marking detected with the lane detection unit 16, the determination unit 14 determines that the person detected overlappingly with the detection range of the another vehicle is false detection. In other words, the person detected overlappingly with a detection range of another vehicle other than the another vehicle traveling in the lane is determined not to be false detection by the determination unit 14.

Figure 5:
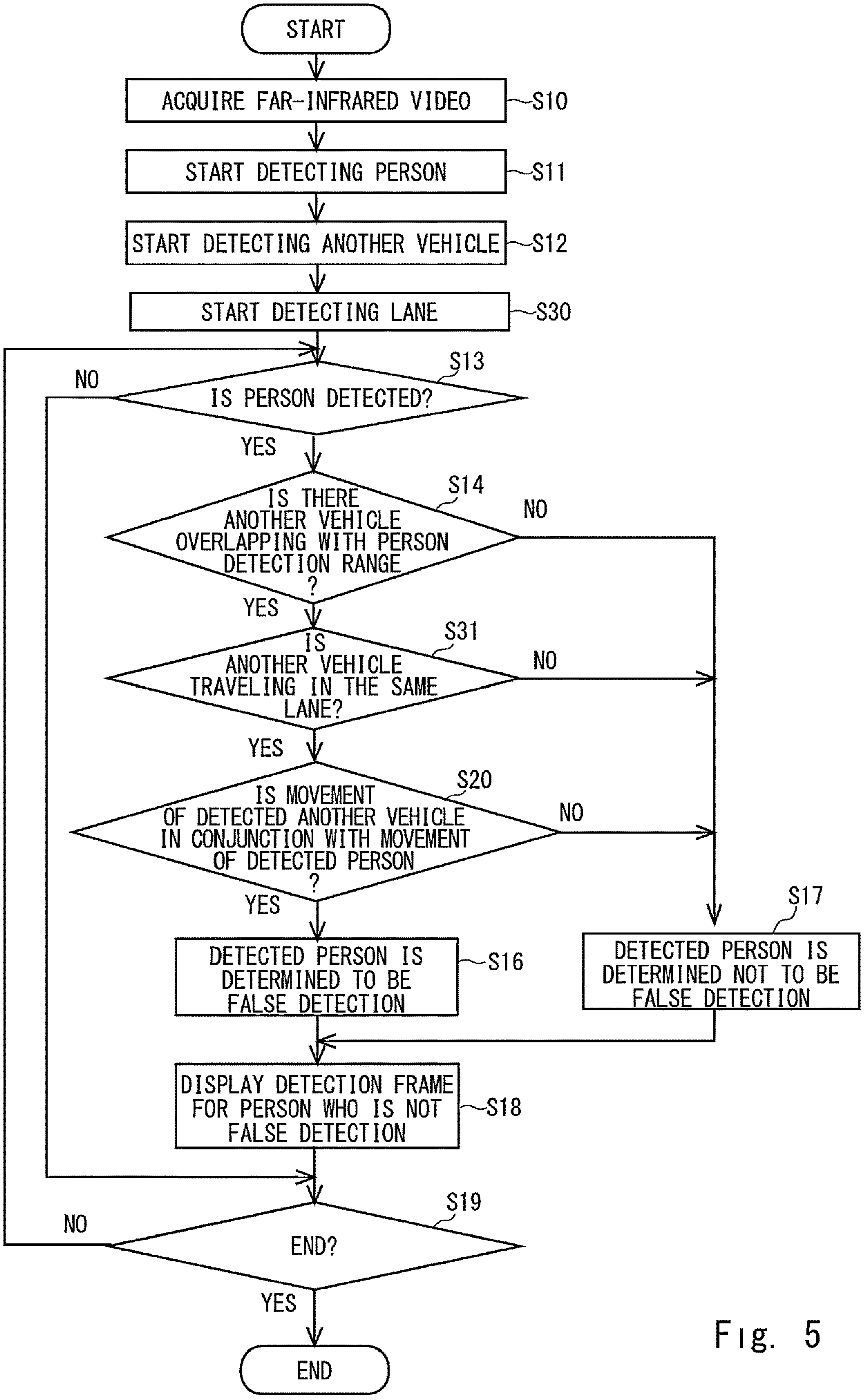
FIG. 5 is a flow chart describing a driving assistance method according to Embodiment 2.

FIG. 5 is a flow chart describing a driving assistance method according to Embodiment 2. In FIG. 5, the same processing as FIG. 2 or FIG. 3 is given the same reference sign. In FIG. 5, a difference from the example illustrated in FIG. 3 is that Step S30 is provided between Step S12 and Step S13, and Step S31 is provided between Step S14 and Step S20. Note that Step S20 may be omitted in FIG. 5.

In Step S30, the lane detection unit 16 detects a lane marking from the far-infrared video, and starts detecting a lane where the own vehicle is traveling which is defined by the detected lane marking. In Step S14, if the another vehicle is traveling (YES of Step S14), whether a lane where the another vehicle is traveling is the lane where the own vehicle is traveling detected with the lane detection unit 16 is determined (Step S31).

In Step S31, if it is determined that the lane where the another vehicle is traveling is the lane where the own vehicle is traveling detected with the lane detection unit 16 (Step S31: YES), the processing progresses to Step S20. Alternatively, if Step S20 is omitted, the processing progresses to Step S16. In Step S31, if it is determined that the lane where the another vehicle is traveling is not the lane where the own vehicle is traveling detected with the lane detection unit 16 (Step S31: NO), the processing progresses to Step S17.

In this manner, in Embodiment 2, in a case where the another vehicle is determined to be traveling, when a detection range of the another vehicle detected with the another vehicle detection unit overlaps with at least a part of a detection range of the person detected with the person detection unit, and if it is further determined that the another vehicle is traveling in the lane where the vehicle is traveling defined by the lane marking detected with the lane detection unit 16, the person detected overlappingly with the detection range of the another vehicle determined to be traveling is determined to be false detection. In this manner, it is possible to prevent false detection of a person in the traveling lane of the own vehicle to which the driver of the own vehicle must pay most attention.

According to the present disclosure, false recognition of a person in a far-infrared video acquired with a far-infrared camera can be reduced.

Note that the configurations of the driving assistance apparatus 10 are not limited to the descriptions above, and a plurality of apparatuses, for example, the driving assistance apparatus 10 and the storage apparatus 21 may be integrated to form a driving assistance apparatus including a storage unit. In addition, all the configurations of the driving assistance system 100 may be integrated to form a driving assistance apparatus including a far-infrared camera, a storage unit, and a display unit.

Note that an apparatus or the like outside the driving assistance system 100 connected via a communication means may be used in place of some configurations of the driving assistance apparatus 10. For example, a server outside the driving assistance system 100 connected via a communication means may be used in place of the person detection unit 12, the another vehicle detection unit 13, and the lane detection unit 16.

Furthermore, in addition to a form in which some or all of the driving assistance apparatus is mounted in the own vehicle, a form in which the driving assistance apparatus is mounted in the own vehicle in a portable or post-installable manner may also be used. Note that, in the descriptions above, the driving assistance system 100 is mounted in an automobile, but it may be mounted in a vehicle other than an automobile.

In addition, in the example mentioned above, the person detection unit 12 and the another vehicle detection unit 13 use image recognition using a model created by machine learning of an image of a vehicle, person, or the like, but the present invention is not limited to this. For example, other image recognition such as pattern matching using a template of another vehicle, person, or the like may also be used.

The invention of the present inventor has been specifically described above based on the embodiments, but the present invention is not limited to the above-described embodiments, and it is needless to say that various changes can be made without departing from the scope of the invention. Two or more of the above-described embodiments can be appropriately combined.

Each functional block performing various processings of the driving assistance apparatus 10 described in the drawings can be formed of a processor, a memory, or other circuits in terms of hardware. In addition, the above-mentioned processing can be achieved by causing a processor to execute a program. Accordingly, these functional blocks can be achieved by a variety of forms using only hardware, only software, or a combination of these, and are not limited to any one of these.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A driving assistance apparatus, comprising:
a processor coupled to a memory storing instructions for the processor to execute:
a video acquisition unit configured to acquire a video in which images of an outside of a vehicle are taken with a far-infrared camera;
a person detection unit configured to detect a person from the video acquired with the video acquisition unit by referring to a person recognition model;
another vehicle detection unit configured to detect another vehicle from the video acquired with the video acquisition unit by referring to a vehicle recognition model, and determine whether the another vehicle which is detected is traveling; and
a determination unit configured to determine that, in a case where the another vehicle is determined to be traveling, when a detection range of the another vehicle detected with the another vehicle detection unit overlaps with at least a part of a detection range of the person detected with the person detection unit, the person detected overlappingly with the detection range of the another vehicle determined to be traveling is not an actual person but is false detection.

2. The driving assistance apparatus according to claim 1, wherein the determination unit is configured to determine that, in a case where the another vehicle is determined to be traveling at a predetermined speed or more, when a detection range of the another vehicle detected with the another vehicle detection unit overlaps with at least a part of a detection range of the person detected with the person detection unit, the person detected overlappingly with the detection range of the another vehicle determined to be traveling is not an actual person but false detection.

3. The driving assistance apparatus according to claim 1, wherein the determination unit is configured to determine that, in a case where the another vehicle is determined to be traveling, if a predetermined ratio or more of the detection range of the person overlaps with the detection range of the another vehicle, the person detected overlappingly with the detection range of the another vehicle determined to be traveling is not an actual person but false detection.

4. A driving assistance apparatus, comprising:
a processor coupled to a memory storing instructions for the processor to execute:
a video acquisition unit configured to acquire a video in which images of an outside of a vehicle are taken with a far-infrared camera;
a person detection unit configured to detect a person from the video acquired with the video acquisition unit by referring to a person recognition model;
another vehicle detection unit configured to detect another vehicle from the video acquired with the video acquisition unit by referring to a vehicle recognition model, and determine whether the another vehicle which is detected is traveling; and
a determination unit configured to determine that, in a case where the another vehicle is determined to be traveling, when a detection range of the another vehicle detected with the another vehicle detection unit overlaps with at least a part of a detection range of the person detected with the person detection unit, the person detected overlappingly with the detection range of the another vehicle determined to be traveling is false detection,
wherein the determination unit determines that the person detected overlappingly with the detection range of the another vehicle determined to be traveling is false detection if a detection position of the another vehicle is determined to be moving in conjunction with a detection position of the person.

5. A driving assistance apparatus, comprising:
a processor coupled to a memory storing instructions for the processor to execute:
a video acquisition unit configured to acquire a video in which images of an outside of a vehicle are taken with a far-infrared camera;
a person detection unit configured to detect a person from the video acquired with the video acquisition unit by referring to a person recognition model:
another vehicle detection unit configured to detect another vehicle from the video acquired with the video acquisition unit by referring to a vehicle recognition model, and determine whether the another vehicle which is detected is traveling;
a determination unit configured to determine that, in a case where the another vehicle is determined to be traveling, when a detection range of the another vehicle detected with the another vehicle detection unit overlaps with at least a part of a detection range of the person detected with the person detection unit, the person detected overlappingly with the detection range of the another vehicle determined to be traveling is false detection; and
a lane detection unit configured to detect, from the video acquired with the video acquisition unit, a lane marking and a lane where the vehicle is traveling based on the lane marking,
wherein the determination unit determines that the person detected overlappingly with the detection range of the another vehicle is false detection if the another vehicle is determined to be traveling in the lane where the vehicle is traveling defined by the lane marking detected with the lane detection unit.

6. The driving assistance apparatus according to claim 1, wherein the processor further executes a display control unit configured to display, on a display apparatus visually observable by a driver of the vehicle, a detection result video in which a person excluding persons determined to be false detection by the determination unit from among persons detected with the person detection unit is emphasized as a person in the video acquired with the video acquisition unit.

* * * * *